(12) United States Patent
Moll et al.

(10) Patent No.: US 6,950,090 B2
(45) Date of Patent: Sep. 27, 2005

(54) INTERFACE FOR TRANSFERRING SIGNALS FROM A HAND-OPERATED SIGNAL GENERATOR

(75) Inventors: Hendrik Frank Moll, Eindhoven (NL); Oscar Reynhout, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 391 days.

(21) Appl. No.: 10/198,783

(22) Filed: Jul. 19, 2002

(65) Prior Publication Data

US 2003/0020686 A1 Jan. 30, 2003

(30) Foreign Application Priority Data

Jul. 24, 2001 (EP) ............................................ 01202838

(51) Int. Cl.[7] .............................. G09G 5/00; G09G 5/08
(52) U.S. Cl. ...................................... 345/156; 345/158
(58) Field of Search ................................ 345/156–158, 345/162, 169–172

(56) References Cited

U.S. PATENT DOCUMENTS

| | | | | |
|---|---|---|---|---|
| 5,142,506 A | * | 8/1992 | Edwards ........................ 367/127 |
| 5,554,980 A | * | 9/1996 | Hashimoto et al. .... 340/825.72 |
| 5,565,891 A | | 10/1996 | Armstrong .................. 345/167 |
| 5,825,350 A | * | 10/1998 | Case et al. .................. 345/163 |
| 6,069,594 A | * | 5/2000 | Barnes et al. .................. 345/7 |

* cited by examiner

Primary Examiner—Vijay Shankar

(57) ABSTRACT

An interface transfers signals from a hand-operated signal generator (1) to a data processing device (2). The hand-operated signal generator (1) is capable of generating at least two types of signals for moving an image in at least two different ways on a display (3) associated with the data processing device (2). Such an image is a 3D image, for example. Each type of signal corresponds to at least one specific mode of operation of the signal generator (1) associated with said type of signal. On the basis of signals generated by the hand-operated signal generator (1), a value determining circuit (23, . . . , 28, 35, 36) in the interface determines a value for each type of signal. On the basis of the values as determined for each type of signal, a relevance determining circuit (39) in the interface determines which of the values determined before is more relevant than the other. In response to an output signal from the relevance determining circuit (39), the transfer of signals of the type having contributed to the ascertained value that is more relevant is released and all other signals are blocked. In this way, it can be ensured that only rotation signals or only translation signals will be transferred to the data processing device (2) from a signal generator (1) arranged to operate six degrees of freedom independently of one another.

14 Claims, 3 Drawing Sheets

INTERFACE FOR TRANSFERRING SIGNALS FROM A HAND-OPERATED SIGNAL GENERATOR

BACKGROUND OF THE INVENTION

Field of the Invention

The invention relates to an interface for transferring signals from a hand-operated signal generator to a data processing device, the hand-operated signal generator being capable of delivering at least two types of signals for moving an image on a display associated with the data processing device in at least two different ways, in which each type of signal corresponds with at least one specific mode of operation of the signal generator associated with said type of signal.

The invention furthermore relates to a method of transferring signals from a hand-operated signal generator to a data processing device, the hand-operated signal generator being capable of delivering at least two types of signals for moving an image on a display associated with the data processing device in at least two different ways, in which each type of signal corresponds with at least one specific mode of operation of the hand-operated signal generator associated with said type of signal.

Such an interface and method are known from U.S. Pat. No. 5,565,891. This patent discloses a hand-operated signal generator which is capable of delivering three rotation signals and three translation signals. The three rotation signals relate to rotations in mutually perpendicular directions and the three translation signals relate to three translations likewise in mutually perpendicular directions. In fact, this patent describes a hand-operated signal generator which makes it possible to have an image on a display undergo three translations in mutually perpendicular directions and three rotations in mutually perpendicular directions, or, in other words, a movement comprising six degrees of freedom. This is also referred to as the manipulation of 3D objects with six degrees of freedom.

Such hand-operated signal generators for manipulating 3D objects with six degrees of freedom are not easy to operate and require a long period of practice before an operator has acquired sufficient skill to carry out a desired rotation, translation or a combination of rotational and translational movement with the desired precision by means of the hand-operated signal generator.

Research carried out at the University of Toronto has shown that many people, when manipulating 3D objects on their display, prefer carrying out one type of movement, such as a rotation, first and then another type of movement, such as a translation, in order to thus effect the desired manipulation. Very few people carry out a manipulation consisting of a combination of rotational and translational movement in one operation.

Furthermore it takes a considerable amount of practice before one is able to control the hand-operated signal generator in such a manner that only one type of signal, for example, only rotation or only translation, is delivered. Generally, a desired rotation will, for example, be accompanied by a translation signal of a certain magnitude, and vice versa. For example, when using the device disclosed in the aforesaid U.S. Pat. No. 5,565,891, it will take a considerable amount of practice to prevent a rotation about an axis of rotation being accompanied by a translation along an axis extending perpendicularly to the axis of rotation. Depending on the pressure that is to be exerted on the spherical element disclosed in U.S. Pat. No. 5,565,891 in order to effect a rotation about an axis in the plane of the device, said pressure will also result in a small, albeit not negligible, signal indicating an undesired translation in a direction perpendicular to the plane of the device.

SUMMARY OF THE INVENTION

The object of the invention is to provide an interface and a method which make it possible to process the signals delivered by a hand-operated signal generator in such a manner that only signals of one type, only translation or only rotation, will be transferred to the data processing device.

An interface according to the invention is characterized in that value determining means are present for determining a value for each type of signal on the basis of signals generated by the signal generator, in that relevance determining means are present for ascertaining which of the values determined by the value determining means is more relevant than any other value determined by the value determining means, as well as transfer means which are arranged for releasing, in response to an output signal from the relevance determining means, the transfer of signals of the type ascertained as being more relevant by the relevance determining means and blocking the transfer of all other signals.

A method according to the invention is characterized in that a value is determined for each type of signal on the basis of the signals generated by the hand-operated signal generator, in that there is determined, on the basis of the values thus determined, which of the values thus determined is more relevant than any other one of the values thus determined, and in that the transfer is released of signals of the type ascertained as being more relevant and in that the transfer of all other signals is blocked.

The result of this arrangement is that when the signals of one type, such as, for example, rotation signals, are determined to be more relevant than signals of another type, such as, for example, translation signals, only signals which represent a rotation will be transferred to the data processing device, whereas the signals representing a translation will not be transferred. In this manner, a combination of the hand-operated signal generator and the data processing device is obtained which is better able to meet the operators' requirements with regard to the way of operation in a situation in which the hand-operated signal generator delivers more than one type of signals. In this manner, it is achieved that the relevance determining means will first automatically determine which type of signals the operator wishes to transfer, after which it is ensured that no other signals will make the result desired by the operator harder to achieve.

A preferred embodiment of an interface according to the invention is characterized in that the value determining means comprise weighting means for assigning weights to signals of at least one type coming from the hand-operated signal generator.

A preferred embodiment of a method according to the invention is characterized in that weights are assigned to the signals of at least one type coming from the hand-operated signal generator.

This achieves that sensors that generate the various types of signals in the hand-operated signal generator can be freely selected and any differences between sensor output signals for different types of signals can be reduced by means of the aforesaid assignment of weights. Furthermore, different types of signals may be assigned different weights relative to each other, as required, and also, within one type of signals, different signal generators may be assigned different weights and thus different importance with regard to value assessment.

BRIEF DESCRIPTION OF THE DRAWINGS

The invention will now be explained in more detail with reference to the accompanying drawings, in which.

DESCRIPTION OF THE PREFERRED EMBODIMENTS

Figure 1:
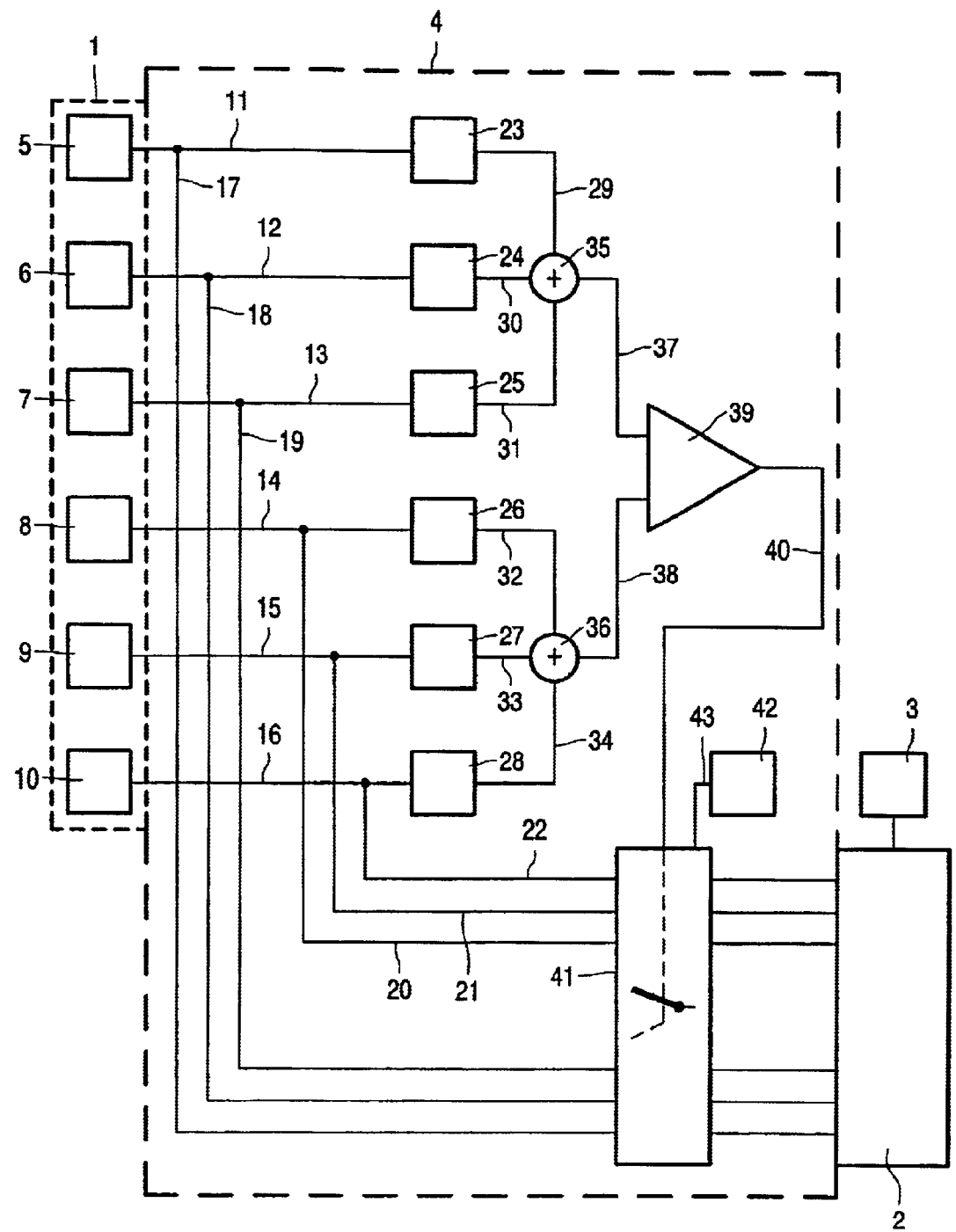
FIG. 1 shows a block diagram of a first embodiment of an interface according to the invention.

In FIG. 1, block 1 diagrammatically represents a hand-operated signal generator. Known hand-operated signal generators, such as the signal generators which are disclosed in, for example, U.S. Pat. No. 5,565,891, comprise six sensors 5, 6, 7, 8, 9 and 10, which are each capable of delivering an output signal on lines 11, 12, 13, 14, 15 and 16, respectively. By way of example, the sensors 5, 6 and 7 are coupled to means (not shown) representing three rotations in mutually perpendicular directions, and the sensors 8, 9 and 10 are connected to means (not shown) representing three translations in mutually perpendicular directions, all this in a manner which is known per se, for example from the aforesaid U.S. patent.

Reference numeral 2 indicates a data processing device, in a general sense also called a computer. The data processing device 2 is connected to a display 3. The data processing device 2 is arranged for processing programs which can display images on the display 3. The data processing device 2 may furthermore include programs which can display images on the display 3, in which movements of the images in question can be controlled by signals from the hand-operated signal generator 1. In particular, the images can be rotated about preferably mutually perpendicular axes on the display 3 by the means that control the sensors 5, 6 and 7, and said images can be translated on the display 3 by operating the means that control the sensors 8, 9 and 10. Rotation and translation are two different types of movement. Research carried out at the University of Toronto has shown that most people prefer not to rotate and translate an image simultaneously on the display 3.

Reference numeral 4 represents, in a block diagram, an interface for coupling output signals from the sensors of the hand-operated signal generator 1 to the data processing device 2. It should be noted that the interface 4 may form part of the hand-operated signal generator 1 or of the data processing device 2, but it may also be a unit separate from the hand-operated signal generator 1 and the data processing device 2. It should also be noted that interface 4 may be in the form of hardware implemented or in the form of software. If interface 4 is in the form of software, it may be preferable to integrate the interface 4 or have it co-operate with a program in data processing device 2 which is capable of displaying images on the display 3, which images can be translated and rotated by means of the hand-operated signal generator 1.

The operation of interface 4 will now be explained in more detail with reference to the diagram of FIG. 1, where the interface will be assumed to be in the form of hardware. It will be understood by those skilled in the art that equivalent software implementations exist for the function of each hardware element and for connections to other hardware elements. The present invention is not restricted to the embodiment in the form of hardware that is shown in the block diagram of FIG. 1, but also extends to the software version of the interface 4, which functionally operates in the same manner as the circuit that is shown in the block diagram of FIG. 1.

In FIG. 1, the output lines 11–16 of the sensors 5–10 are connected to elements 23–28 which render the format of the signals on the lines 11–16 suitable for further processing. The signals delivered by the sensors 5, 6 and 7 are supplied to a summing device 35 via the lines 29, 30 and 31, respectively, after being processed in the respective elements 23, 24 and 25. Likewise, signals from the sensors 8, 9 and 10 are supplied to a summing device 36 via the elements 26, 27 and 28, respectively, and the lines 32, 33 and 34, respectively. An output of summing device 35 is connected to a first input of a comparator 39 via line 37. An output of summing device 36 is connected to a second input of a comparator 39 via line 38. An output of comparator 39 is connected to a control input of a multiple switch 41 via line 40. Lines 11, 12 and 13 are connected to one input group of switch 41 via lines 17, 18 and 19, respectively. Lines 14, 15 and 16 are connected to another input group of switch 41 via lines 20, 21 and 22, respectively. Output groups of switch 41 are connected to signal input groups of data processing device 2. Element 42, which can be controlled directly or indirectly, is also connected to a control input of switch 41 via a line 43.

An output signal from element 42, which is supplied to switch 41 via line 43, alternately puts switch 41 in a position in which all the signals on all the lines 17–22 are directly transferred to data processing device 2 and in a position in which switch 41 is controlled by signals from comparator 39 on line 40, as a result of which, switch 41 transfers either the signals on the lines 17, 18 and 19 or the signals on the lines 20, 21 and 22 to the data processing device 2.

Hereinafter it will be assumed that the sensors 5, 6 and 7 generate "rotation"-type signals and that the sensors 8, 9 and 10 generate "translation"-type signals.

It is assumed that multiple switch 41 is in the position in which either the signals present on the lines 17, 18 and 19 or the signals present on the lines 20, 21 and 22 are transferred to the data processing device 2. The decision for determining which of these sets of signals, the set of signals on the lines 17, 18 and 19 or the set of signals on the lines 20, 21 and 22, is to be transferred to the data processing device 2, is made as follows. If an operator of the hand-operated signal generator 1 wishes to effect a rotation and/or translation of an image on the display 3, the operator will operate the control means that are present on the hand-operated signal generator 1 for this purpose. This will cause the sensors 5–10 to deliver signals. In the case of a fairly inexperienced operator, all, or practically all, of the sensors 5–10 will deliver signals at the same time, and in the case of a very experienced operator, only some of the sensors 5–10 will deliver a signal. In practice, it has turned out, however, that it is well-nigh impossible, for example, if a rotation is desired, to ensure that no signals will be received from the translation sensors 8, 9 and 10, and vice versa. The fact of the matter is that the signals of the type corresponding to the movement that is not desired, "translation"-type signals in the above case, will be smaller than the signals of the type corresponding to the movement that is really desired, that is, "rotation"-type signals in the above case.

The output signals of the sensors 5, 6 and 7 on the lines 11, 12 and 13, respectively, are supplied to the summing device 35 via lines 29, 30 and 31, respectively, after weights have been assigned to the signals by the elements 23, 24 and 25. An output signal of summing device 35 consists of a weighted sum, which may be normalized, as desired, of the output signals of the sensors 5, 6 and 7. In like manner, an output signal from the summing device 36 is a weighted sum, if so desired normalized, of the output signals of the sensors 8, 9 and 10.The sum signals on the output of the summing devices 35 and 36 are supplied to comparator 39 via lines 37 and 38. Comparator 39 compares the output signals of the summing devices 35 and 36. If the signal on line 37 is larger than the signal on line 38, which corresponds to the situation in which the "rotation"-type signals are more relevant than "translation"-type signals, comparator 39 will deliver a signal on its output on line 40, so that switch 41 is put in a position in which the signals present on the lines 17, 18 and 19 are transferred to the data processing device 2 and that the signals present on the lines 20, 21 and 22 are blocked.

In the reverse case, if the signal present on line 38 is larger than the signal on line 37, a signal will appear on the output of the comparator 39 on line 40, which will put switch 41 in the position in which signals present on the lines 20, 21 and 22, being more relevant, are transferred to the data processing device 2 and signals present on the lines 17, 18 and 19, not being more relevant, are blocked.

The summing devices 35 and 36, possibly with the associated elements 23, 24, 25 and 26, 27, 28, respectively, constitute value-determining means for determining a value for each of the two types of signal. The comparator 39 constitutes relevance determining means which is coupled to the value determining means and determines which of the values determined by the value determining means is more relevant than any other value determined by the value determining means. The switch 41 forms release means which is arranged for releasing, in response to an output signal from the relevance determining means, i.e., the comparator 39, the transfer of signals of the type ascertained as being more relevant by the relevance determining means, and blocking the transfer of all other signals.

If an operator, irrespective of the fact whether he is experienced or not, operates the hand-operated signal generator 1 and the switch 41 is in the position in which either the signals on the lines 17, 18 and 19 or the signals on the lines 20, 21 and 22 are transferred to the data processing device 2, the switch 41, as described above, will take up the position that corresponds to the "rotation" or the "translation"-type signals that the comparator 39 has determined to be more relevant than the signals of the other type. As a result, either "rotation"-type signals or "translation"-type signals will be transferred to the data processing device 2 at all times, irrespective of the degree of experience of the operator.

Figure 2:
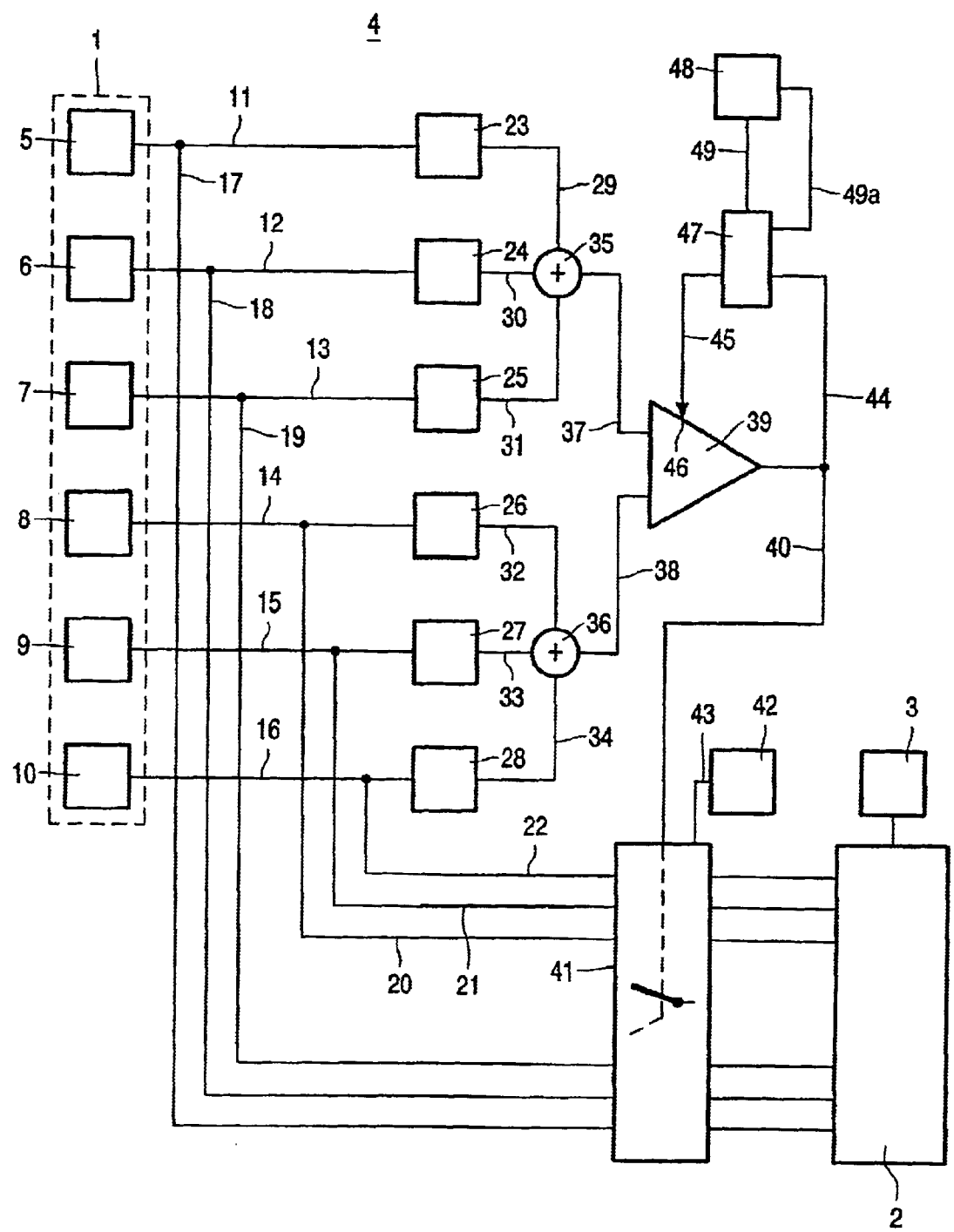
FIG. 2 shows a block diagram of a second embodiment of an interface according to the invention.
Figure 3:
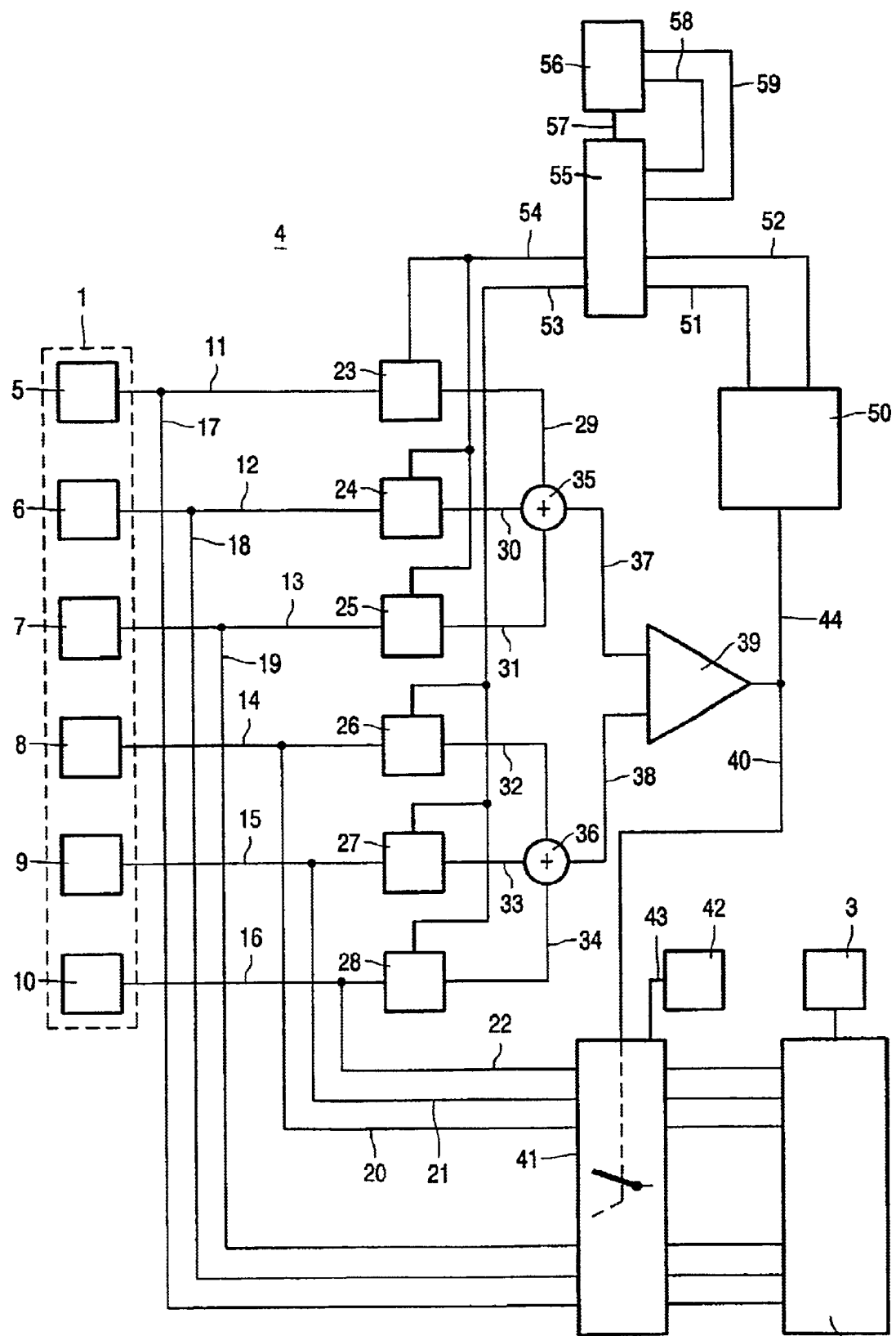
FIG. 3 shows a block diagram of a third embodiment of an interface according to the invention.

FIGS. 2 and 3 show two further embodiments of an interface according to the invention, in which a certain degree of hysteresis can be provided in two different ways to prevent the switch 41 from switching from one position to another, and vice versa, in the situation in which the output signals from the devices 35 and 36 are practically equal.

In FIGS. 2 and 3, elements identical with those shown in FIG. 1 are indicated by like reference numerals. For the sake of clarity, the dashed line of interface 4 has been left out.

As far as the elements indicated by the reference numerals 1–43 are concerned, the operation of the interface that is shown in FIG. 2 is identical with the operation of the interface that has been discussed above with reference to FIG. 1, with the exception of the comparator 39', whose function in FIG. 2 is more comprehensive than that of the comparator 39 of FIG. 1.

In FIG. 2, the circuit of FIG. 1 has been extended with a line 44 coupling the output of the comparator 39' to a switch 47, and a line 45 between switch 47 and a control input 46 of comparator 39'. A control element 48 is connected to switch 47 via lines 49 and 49a. It is noted that the control element 48 may be a separate element or consist of one or more keys of a keyboard associated with the data processing device 2. Upon operation of the control element 48, a signal is put on the line 49, this signal causing the switch 47 to switch in such a manner that a signal on line 49a, also coming from the control element 48, is transferred to line 45. In a position of rest, switch 47 transfers the signals on line 44 to line 45. Input 46 inside comparator 39' is connected so that the signals present on the lines 37 and 38 must differ to a certain degree before the output signal of the comparator 39 changes from one state to the other. The one state of the output of comparator 39 is understood to mean that switch 41 is in the one position in which the signals on the lines 17, 18 and 19 are transferred and the signals on the lines 20, 21 and 22 are blocked. The other state of the output of comparator 39 is understood to mean the state which causes the switch 41 to be put in the position in which the signals on the lines 20, 21 and 22 are transferred to the data processing device 2 and signals on the lines 17, 18 and 19 are blocked. Comparator 39' is now arranged in a manner known per se in such a way that when the switch 41 is in one switching position in which signals on the lines 17, 18 and 19 are transferred to data processing device 2, that is, if the value of the signal on line 38 has been established to be more relevant than the value of the signal on line 37, a change of state of the output signal of the comparator 39' does not occur already if the signals on lines 37 and 38 are equal, but only if the value of the signal on line 37 has already exceeded the value of the signal on line 38 to a certain extent. If this situation occurs, the state of the output of comparator 39' will actually change, switch 41 will change over, and a signal will appear on input 46, via line 44, switch 47 and line 45, which causes the requirement for changing the state of the output signal from comparator 39' to be reversed. This means that the signal on line 38 must, to a certain extent, be larger than the signal on line 37 to effect a change of state of the output signal of comparator 39. If the signals on the lines 37 and 38 are equal, nothing will happen yet. In this way, the certain degree of hysteresis is introduced in interface 4 which is controlled by the output signal of the comparator 39'. The degree of hysteresis can be set by means of control element 48, lines 49 and 49a and switch 47. To this end, the control element 48 is operated, so that a signal which puts the switch 47 in the position in which the line 45 is connected to the line 49a will appear on line 49. Operation of the control element 48 at the same time results in a signal being generated on line 49a, this signal setting the degree of hysteresis in the comparator 39' via line 45 and input 46. The degree of hysteresis in the comparator 39' is determined by the limiting values that must be exceeded by the signals on the lines 37 and 38 before a change of state of the output of the comparator 39' occurs.

FIG. 3 shows a different manner of introducing hysteresis in interface 4. The output of comparator 39 is also connected to a signal generator 50 via line 44. Two outputs of the signal generator 50 are connected to two inputs of a switch 55 via line 51 and line 52, respectively. Two outputs of switch 55 are connected to control inputs of elements 26', 27' and 28' and elements 23', 24' and 25', respectively, via lines 53 and 54. A control element 56 is connected to a control input of the switch 55 via line 57. Two outputs of the control element 56 are connected to a third and fourth input, respectively, of switch 55 via lines 58 and 59.

The elements 23'–28' are adjustable via control inputs. This enables the elements 23'–28' to assign weights to the signals on the lines 11–16 in an adjustable manner. The signals on the lines 53 and 54 assign weights to the elements 26', 27', 28' and 23', 24', 25', respectively.

For the time being, it is assumed that switch 55 is in the position in which signals on line 51 are transferred to line 53 and signals on line 52 are transferred to line 54.

In the situation shown in FIG. 1, the initial state of comparator 39 on line 40 will change if values of the signals on the lines 37 and 38 are equally large and exceed one another. In the case of hysteresis, as in FIG. 2 and FIG. 3, a change of state will take place the moment the signals on the lines 37 and 38 differ from each other to a certain extent and the difference is increasing.

In FIG. 3, two states of the output of comparator 39 are possible. It is assumed that the output of comparator 39 is in a first of said two states, namely the state in which the signal on line 38 is larger than the signal on line 37. This corresponds to the situation in which the translation signals coming from the sensors 8, 9 and 10 are currently more relevant than the rotation signals coming from the sensors 5, 6 and 7. In the embodiment shown in FIG. 3, the output of comparator 39 changes state if the signal on line 38 increases in value from a value lower than that of the signal on line 37 to a value higher than that of the signal on line 37, and vice versa, as was the case with the circuit shown in FIG. 1. In this case, hysteresis means that the signals coming from the sensors 5, 6 and 7 of the circuit shown in FIG. 3 must be larger than the output signals of the sensors 5, 6 and 7 of the circuit shown in FIG. 1 before the signal on line 37 can become larger than the signal on line 38. In order to achieve this result, the elements 23'–28' are set by the control signals on the lines 53 and 54, so that the elements 26', 27' and 28' transfer the signals from the sensors 8, 9 and 10 unchanged (except for a weight factor which is also present in the circuit shown in FIG. 1), while the signal on line 54 causes the elements 23', 24' and 25' to attenuate the signals coming from the sensors 5, 6 and 7 to a certain extent. As a result of the attenuation caused by the elements 23'–25', the signals on the lines 11, 12 and 13 coming from the sensors 5, 6 and 7 must be larger than in the corresponding situation shown in FIG. 1 before the signal on line 37 becomes equal to and larger than the signal on line 38. As soon as the state of the output of comparator 39 has subsequently been changed to the other state, causing switch 41 to switch over, circuit 50 will change the state of the signals on the lines 51 and 52 and, consequently, on the lines 53 and 54. As a result, the elements 23', 24' and 25' will transfer the signals coming from the sensors 5, 6 and 7 unchanged and the signals coming from the sensors 8, 9 and 10 will be attenuated to a certain degree. When the degree of attenuation by the elements 26', 27' and 28' is the same as the previous degree of attenuation effected by the elements 23', at 24' and 25', this change of state will not have any consequences for the equality or inequality of the signals on the lines 37 and 38. The value of the signal on line 37 has now been determined to be more relevant than the value of the signal on line 38. The state of the sensors 8, 9 and 10 is now the same as the previous one of the sensors 5, 6 and 7. In the situation shown in FIG. 3, this means that the sensors 8, 9 and 10 must deliver larger signals than in the situation shown in FIG. 1 before the signal on the line 38 is ascertained to be more relevant and the signal on the line 37 is ascertained not to be more relevant, causing another change of state to occur of the output signal of the comparator 39. Hysteresis has thus also been effected in this manner.

As it was possible with control element 48, switch 47 and lines 49 and 49a in the embodiment shown in FIG. 2 to change state or set the degree of hysteresis, this is also possible in the embodiment shown in FIG. 3 with control element 56, switch 55, line 57 and the lines 58 and 59. By operating the control element 56, a control signal is transferred via line 57 by means of switch 55, as a result of which switch 55 sets up a connection between line 58 and line 54 as well as between line 59 and line 53 and breaks off the connections between the lines 51 and 52, on the one hand, and lines 53 and 54, on the other. In this manner, it is possible to influence the degree of hysteresis in the circuit shown in FIG. 3 by means of the control element 56.

A great many embodiments and modifications will be apparent to a person skilled in the art after having read the foregoing. All such embodiments and modifications are considered to fall within the scope of the invention.

What is claimed is:

1. An interface for transferring signals from a hand-operated signal generator to a data processing device, said hand-operated signal generator being capable of delivering at least two groups of signals for imparting, respectively, at least two different forms of motion on an image on a display (3) associated with the data processing device, in which each signal group corresponds with at least one specific mode of operation of the signal generator (1) associated with said signal group, characterized in that said interface comprises:
   value determining means for determining a value for each signal group on the basis of signals in the signal group generated by the hand-operated signal generator;
   relevance determining means connected to the value determining means for ascertaining which of the at least two signal groups is more relevant than the others of the at least two signal groups based on the values determined by the value determining means; and
   transfer means for transferring, in response to an output signal from the relevance determining means, the signals of the signal group ascertained as being more relevant by the relevance determining means, and blocking the transfer of the signals of all other of the at least two signal groups.

2. The interface as claimed in claim 1, characterized in that said value determining means comprises weighting means for assigning weights to signals of at least one of the signal groups coming from the hand-operated signal generator.

3. The interface as claimed in claim 2, characterized in that said weighting means comprises setting means for setting said weights.

4. The interface as claimed in claim 1, characterized in that the relevance determining means comprises hysteresis means for applying, at an occurrence of at least one moment during operation, a first limiting value to be exceeded to values determined by the value determining means that the relevance determining means has ascertained at the at least one moment to be not more relevant, and for applying a second limiting value to be exceeded, different from the first limiting value, to the value determined by the value determining means that the relevance determining means has ascertained to be more relevant at said at least one moment.

5. The interface as claimed in claim 4, characterized in that said limiting values are adjustable.

6. The interface as claimed in claim 2, wherein the weights of said weighting means are adjustable, characterized in that said interface further comprises hysteresis means for generating signals for adjusting the weights of the weighting means in response to an output signal from the relevance determining means.

7. The interface as claimed in claim 6, characterized in that said interface comprises means for setting a degree to which the generated signals adjust the weights of the weighting means.

8. A method of transferring signals coming from a hand-operated signal generator to a data processing device, said hand-operated signal generator being capable of generating at least two groups of signals for imparting, respectively, at least two different forms of motion on an image on a display associated with the data processing device, in which each signal group corresponds with at least one specific mode of operation of the hand-operated signal generator associated with said signal group, characterized in that said method comprises the steps:

determining a value is determined for each signal group on the basis of the signals delivered by the hand-operated signal generator;

determining, on the basis of the values thus determined, which of the signal groups is more relevant than any other of the at least two signal groups; and transferring signals of the signal group ascertained as being more relevant and blocking the transfer of signals of all other of the at least two signal groups.

9. The method as claimed in claim 8, characterized in that said method comprises the step:

assigning weights to signals of at least one of the at least two signal groups coming from the hand-operated signal generator.

10. The method as claimed in claim 9, characterized in the weights are adjustable, and in that said method further comprises the step:

setting the adjustable weights.

11. The method as claimed in claim 8, characterized in that hysteresis is used when a change-over takes place from one signal group that is more relevant to another signal group that is more relevant.

12. The method as claimed in claim 11, characterized in that said hysteresis includes adjustable limiting values at which a change-over from one type of less-relevant signal to the other type of less-relevant signal takes place, and said method comprises the step:

setting the adjustable limiting values.

13. A hand-operated signal generator for generating at least two groups of signals, in which each signal group corresponds to at least one specific operating method of the hand-operated signal generator associated with that signal group, characterized in that the hand-operated signal generator comprises an interface as claimed in claim 1.

14. A data processing device which can be connected to a hand-operated signal generator, the hand-operated signal generator being capable of generating at least two groups of signals for imparting, respectively, at least two forms of motion to an image on a display associated with the data processing device (2), characterized in that the data processing device comprises an interface as claimed in claim 1.

* * * * *